(12) United States Patent
Wu et al.

(10) Patent No.: US 7,790,259 B2
(45) Date of Patent: *Sep. 7, 2010

(54) CUT-FREE MAGNETIC TAPE STRUCTURE

(76) Inventors: Hung-Chih Wu, No. 31, Lane 268, Hsin-shu Rd., Hsin-Chuang, Taipei county (TW); Chen-Liang Fan Chiang, No. 31, Lane 268, Hsin-shu Rd., Hsin-Chuang, Taipei county (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/377,298

(22) Filed: Mar. 17, 2006

(65) Prior Publication Data

US 2007/0218235 A1   Sep. 20, 2007

(51) Int. Cl.
  *B32B 9/00* (2006.01)
  *B32B 7/12* (2006.01)
  *B65D 65/28* (2006.01)

(52) U.S. Cl. .................. 428/40.1; 428/42.1; 428/43; 428/343; 428/900; 428/906

(58) Field of Classification Search .............. 428/40.1, 428/42.1, 43, 900, 906, 343
See application file for complete search history.

(56) References Cited

U.S. PATENT DOCUMENTS

| | | | | |
|---|---|---|---|---|
| 3,908,065 | A | * | 9/1975 | Stigen ..................... 428/329 |
| 2006/0172103 | A1 | * | 8/2006 | Chang ..................... 428/40.1 |
| 2007/0218234 | A1 | * | 9/2007 | Wu et al. ................. 428/40.1 |

* cited by examiner

*Primary Examiner*—Patricia L Nordmeyer
(74) *Attorney, Agent, or Firm*—Bacon & Thomas, PLLC

(57) ABSTRACT

A cut-free magnetic tape structure including an elongated tape-type soft magnetic substrate. The substrate has an upper releasable face and a lower adhesive face. A sprayed or painted coating is sprayed or painted on the releasable face. An adhesive layer is overlaid on the adhesive face. At least one of the two faces of the substrate is embossed with embossed textures. The embossed textures are one by one adjacently arranged on the face in an extending direction of the tape structure. The elongated tape can be wound into a roll for easy carriage. A user can apply an external force or shear force to the substrate along at least one embossed texture to tear apart the tape or tear off a segment of the embossed magnetic tape.

30 Claims, 7 Drawing Sheets

CUT-FREE MAGNETIC TAPE STRUCTURE

BACKGROUND OF THE INVENTION

The present invention is related to a cut-free magnetic tape structure. A soft magnetic substrate of the tape structure is formed with multiple embossed textures. The embossed textures are one by one adjacently arranged on the substrate in an extending direction of the tape structure. A user can manually tear apart the tape or tear off a segment of the tape in a forming direction of any embossed texture without using any tool.

Soft magnets have been widely used recently. Ferric oxide powder or other magnetizable powder is added into a complex sheet material or block material which is a mixture of rubber and plastic or resin. The material is at least once magnetized. Pulse current passes through a magnetic conductive disc with different magnetized divisions to induce different magnetic poles on the surface of the substrate material. Accordingly, a flexible and soft magnet is formed. Such soft magnets can attract each other or attract an iron-made object (attracted object). The soft magnet serves as the material of decorative magnetic block (sheet), magnetic clip, etc. Recently, thin soft magnetic sheets have been developed to widen the application range of soft magnets.

In general, the soft magnet must be previously magnetized and cut in manufacturing procedure before used.

The conventional soft magnet is cut and divided into custom-made products. Thin sheet magnet is cut by means of a cutting tool. This is inconvenient in use. Moreover, in the case of long-distance cutting operation of the soft magnet, a locating platform is necessary for precise measurement and cutting operation. In a modularized production line of soft magnet, the measurement and cutting operation complicate the production procedure and increase the manufacturing cost. As a result, the production capacity is lowered.

A conventional single-face tape is wound into a roll. When used, one end of the tape is pulled out and cut into a segment. The segment of the tape can be attached to an article as a protective cover. The thin sheet magnet can be combined with such tape to achieve more convenience. Taiwanese Utility Model Patent No. 500126 discloses an improved double-face tape. The main body of the tape is made of soft plastic material such as PVC or EVA. An adhesive layer is painted on bottom face of the tape main body. A high-adhesion double-face adhesive film is integrally combined with top face of the tape main body, whereby both faces of the tape main body are adhesive. A double-face oily releasable paper is attached to the back face of the adhesive film. The tape main body is wound into a roll.

It is tried by the applicant to combine the thin sheet magnetic substrate with the texture of the conventional tape to form a magnetic tape structure which can be easily torn off. A sprayed or painted coating is sprayed or painted on a first face of the magnetic substrate. An adhesive layer is overlaid on a second face of the magnetic substrate. Therefore, the magnetic tape has both adhesion and magnetic attraction.

SUMMARY OF THE INVENTION

It is therefore a primary object of the present invention to provide a cut-free magnetic tape structure including an elongated tape-type soft magnetic substrate. The substrate has a releasable face and an adhesive face. A sprayed or painted coating is sprayed or painted on the releasable face. An adhesive layer is overlaid on the adhesive face. At least one of the two faces of the substrate is embossed with embossed textures. The embossed textures are one by one adjacently spreadingly arranged on the face. The elongated tape can be wound into a roll for easy carriage. A user can apply an external force or shear force to the substrate in the forming direction of at least one embossed texture to easily tear apart the tape or tear off a segment of the embossed magnetic tape.

The present invention can be best understood through the following description and accompanying drawings wherein:

DETAILED DESCRIPTION OF THE PREFERRED EMBODIMENTS

Figure 1:
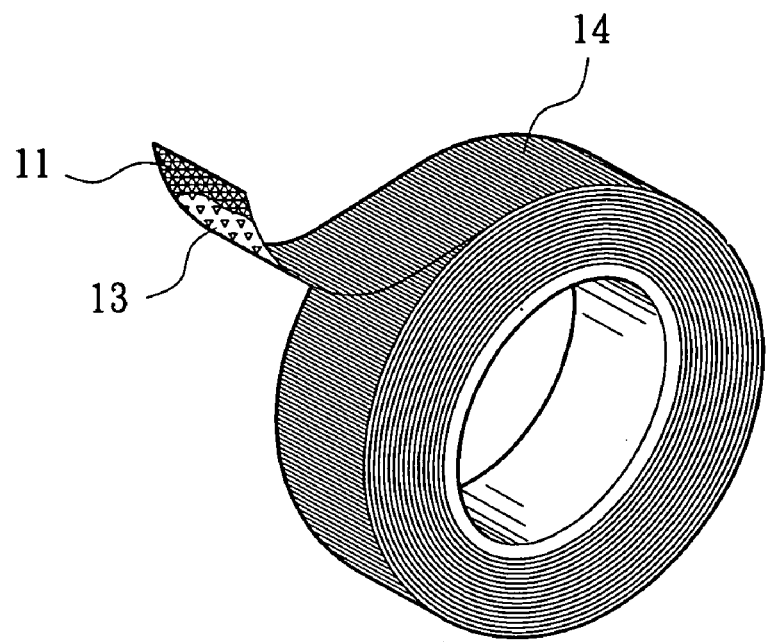
FIG. 1 is a perspective view of the present invention.
Figure 2:
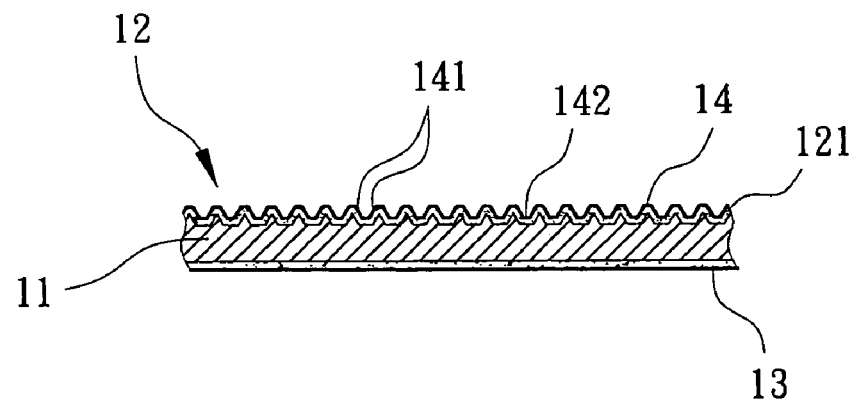
FIG. 2 is a sectional view of the present invention, showing the embossed textures arranged at equal intervals.
Figure 2A:
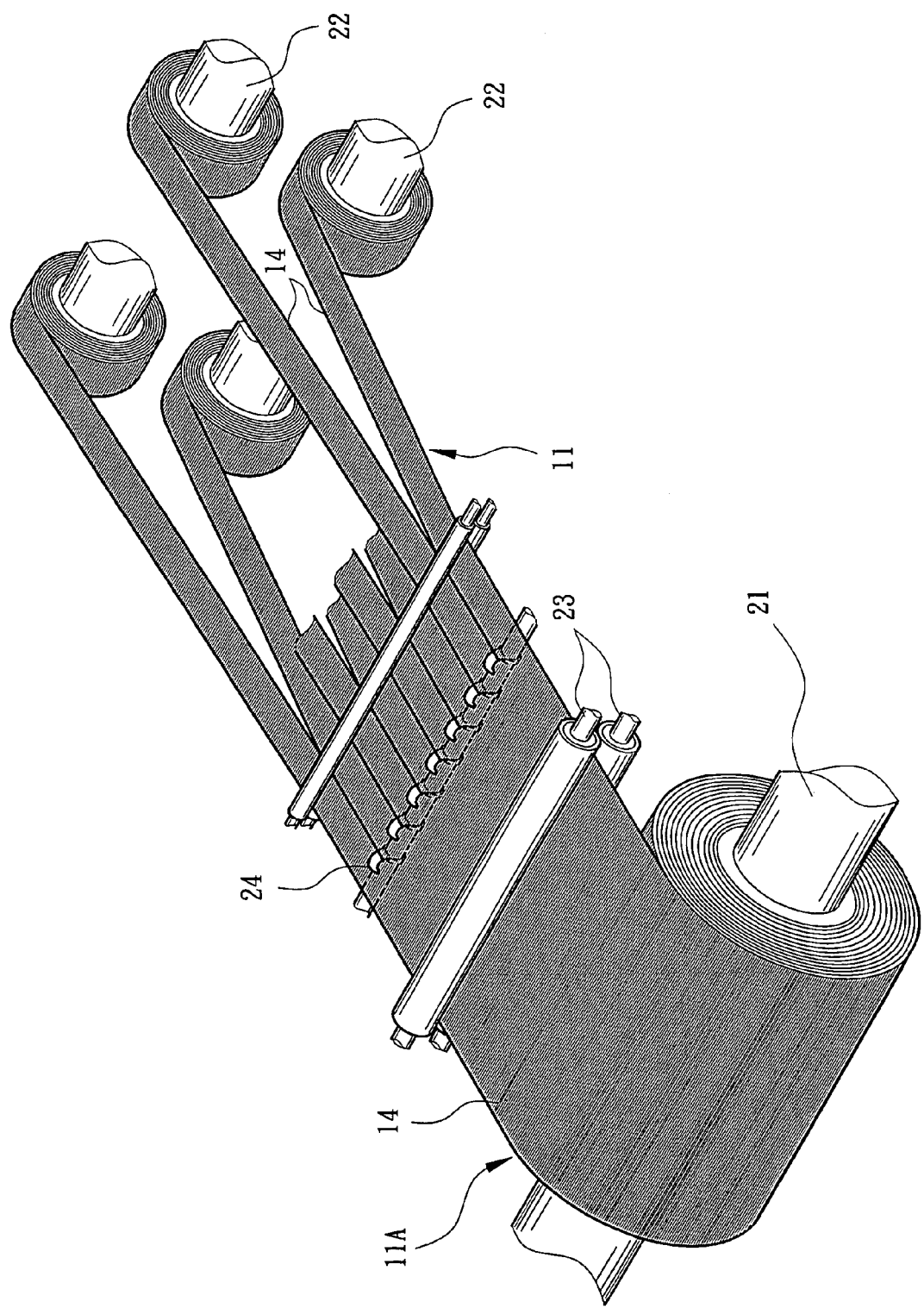
FIG. 2A shows the cutting and winding operation of a cutting machine of the present invention.

Please refer to FIGS. 1 and 2. The cut-free magnetic tape structure of the present invention includes an elongated tape-type soft magnetic substrate 11. The substrate 11 has an outer releasable face 12 and an inner adhesive face having an adhesive layer 13. A sprayed or painted coating 121 of releasable agent or color is sprayed or painted on the releasable face 12. The releasable face 12 is formed with continuous embossed textures 14. The embossed textures 14 are one by one adjacently continuously arranged on the releasable face 12 in an extending direction of the tape structure. The embossed textures 14 can be arranged at equal intervals (as shown in FIG. 2) or at unequal intervals (as shown in FIG. 2C). Multiple magnetic poles with different polarities can be alternately adjacently arranged on the substrate 11 in the extending direction thereof. The embossed textures 14 can be arranged at intervals on the basis of unit interval of the different magnetic poles (as shown in FIG. 2D). In this embodiment, the embossed textures 14 are grooves arranged on the releasable face 12 with a set depth. The substrate 11 can be wound into a roll.

FIG. 2 is an enlarged sectional view of the magnetic substrate 11, showing that the embossed textures 14 are adjacently continuously arranged on the substrate 11 at equal intervals (or unequal intervals or intervals of the magnetic poles) to form a sawtooth-like structure. Each embossed texture 14 has a ridge section 141 and a valley section 142 adjacent to the ridge section 141. The thickness of the substrate 11 is thinned at the valley section 142, whereby the magnetic tape can be torn off by an external shear force along the valley section 142. According to this embodiment, a user can tear off a segment of the magnetic tape without using any cutting tool. Alternatively, the embossed textures 14 can be dotted lines or linearly arranged orifices (as shown in FIG. 4A).

In a preferred embodiment, the tape-type soft magnetic substrate 11 is made from a mixture of plastic, rubber or resin material and magnetizable material. The mixture is formed into a thin sheet or blank substrate 11A (as shown in FIG. 2A). Then, in a production line, the thin sheet or blank substrate 11A is magnetized. In the production procedure, a sprayed coating 121 of releasable agent or paint is sprayed on the upper face of the blank substrate 11A. In addition, a high-adhesion adhesive layer 13 (such as pressure-sensitive adhesive layer) is laid on the lower face of the blank substrate 11A. Then the blank substrate 11A is wound into a roll by means of an automatic cutting machine. In the winding procedure, the adhesive layer 13 faces inner side, while the releasable face 12 faces outer side. The magnetic tape is wound into a roll. The sprayed coating 121 serves to isolate the adhesive layer 13, whereby the inner and outer faces of the substrate 11 can be torn apart.

FIG. 2A shows the cutting and winding operation of an automatic cutting machine. The cutting machine includes a main roller 21, a pair of feeding rollers 23, multiple subsidiary rollers 22 and a cutting unit 24. The substrate 11A embossed with embossed textures 14 is unwound from the main roller 21 to pass through the feeding rollers 23. The feeding rollers 23 then feed the substrate 11A to the cutting unit 24 which cuts the substrate 11A into several strips. The strips are respectively wound on the subsidiary rollers 22 into several rolls.

Figure 2B:
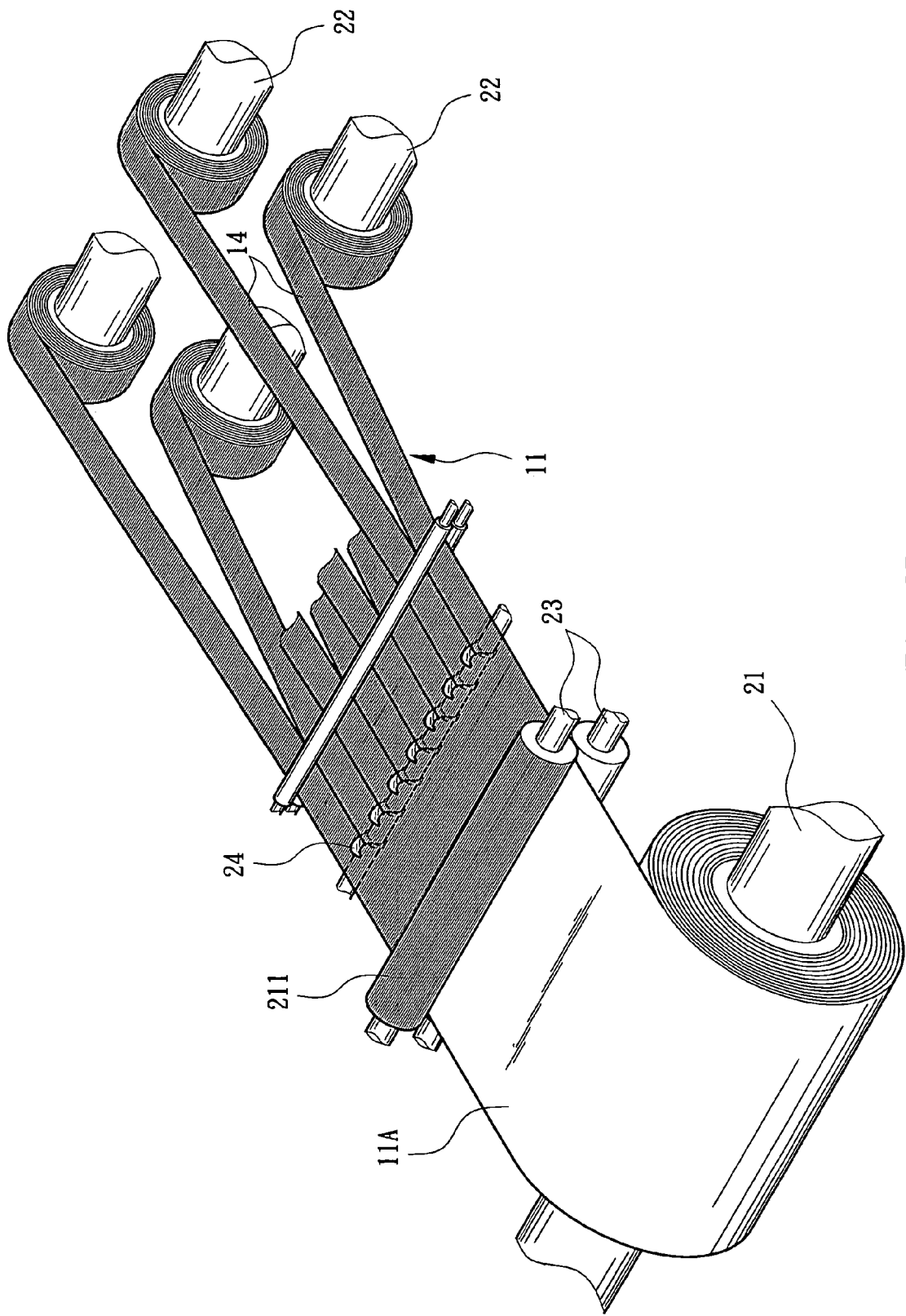
FIG. 2B shows the cutting and winding operation of another cutting machine of the present invention, in which the cutting machine simultaneously embosses the blank substrate.
Figure 2C:
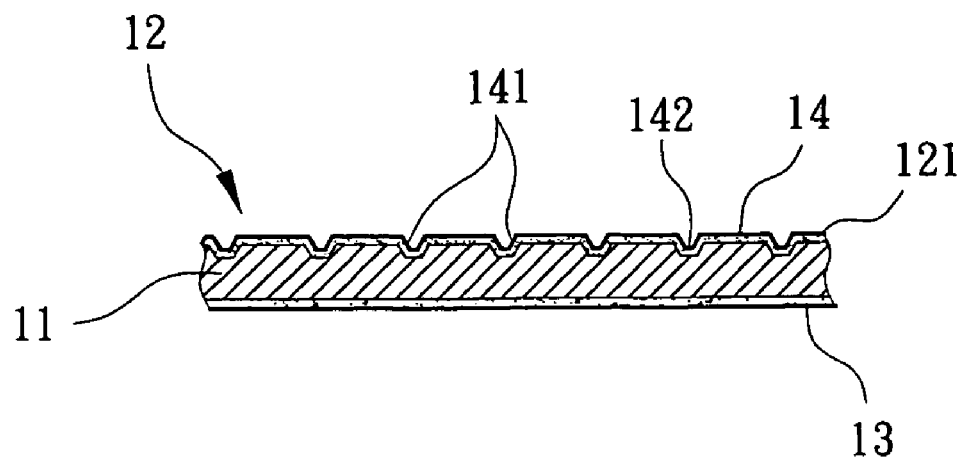
FIG. 2C is a sectional view of the present invention, showing the embossed textures arranged at unequal intervals.
Figure 2D:
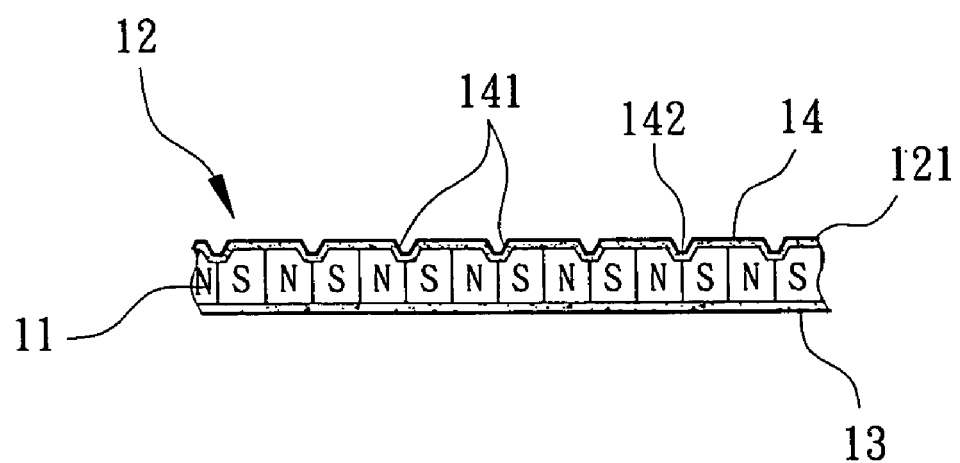
FIG. 2D is a sectional view of the present invention, showing the embossed textures arranged at intervals of magnetic poles.
Figure 3A:
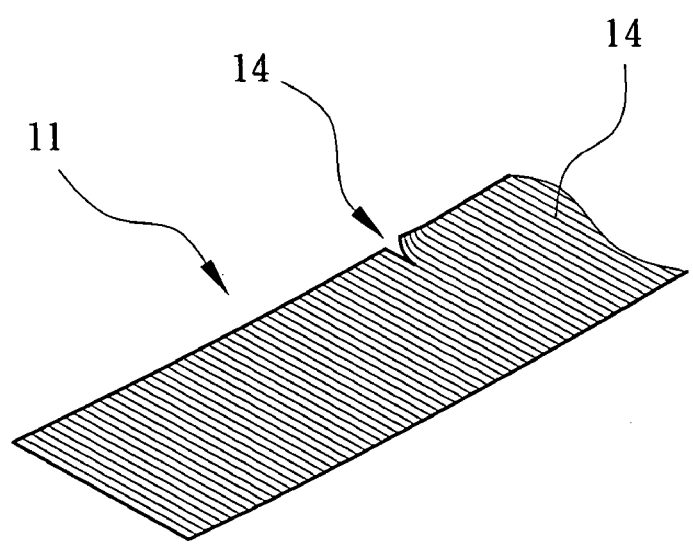
FIG. 3A is an enlarged view according to FIG. 3.

FIG. 2B shows another cutting machine which can simultaneously emboss the magnetic tape. One of the feeding rollers 23 is formed with embossing marks 211 for embossing the releasable face 12 of the substrate 11A. When the substrate 11A passes through the feeding rollers 23, the substrate 11A is embossed with the embossed textures 14 and then cut and wound. The pattern of the embossed textures 14 is determined by the pattern of the embossing marks 211. After embossed, the substrate 11 is formed with transversely lines (FIG. 3A), longitudinal lines (FIG. 5A), dotted lines or lined up orifices (FIG. 4A), waved lines (FIG. 5) or the like.

Figure 3:
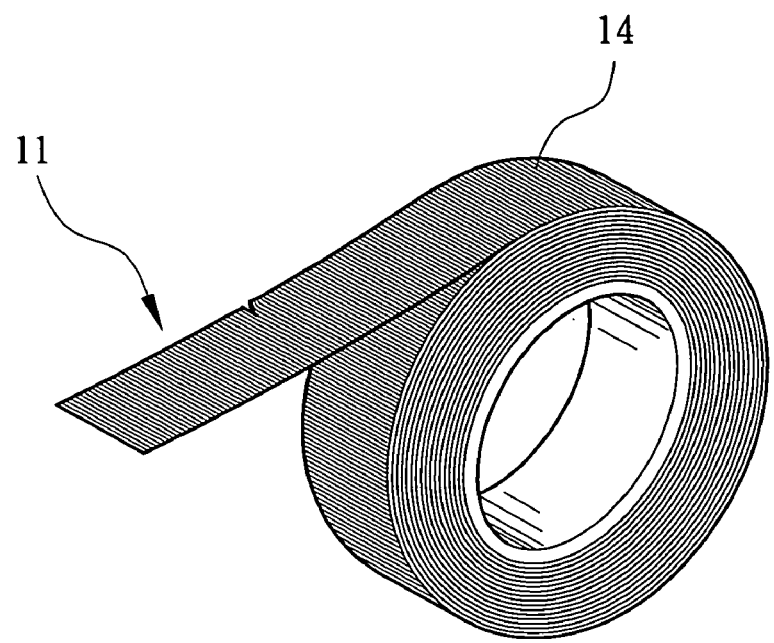
FIG. 3 is a perspective view of the present invention, showing that the magnetic tape is embossed with transverse stripes.
Figure 4:
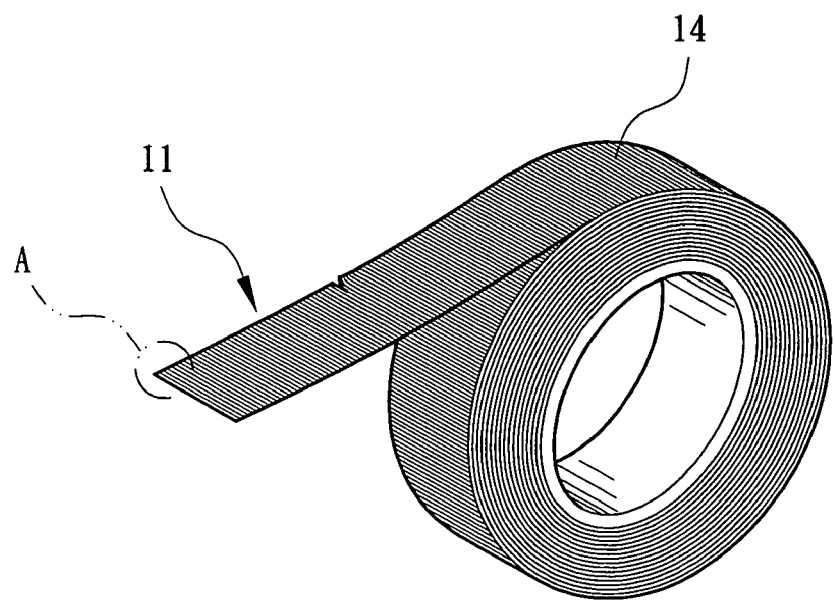
FIG. 4 is a perspective view of the present invention, showing that the magnetic tape is embossed with dotted lines.
Figure 4A:
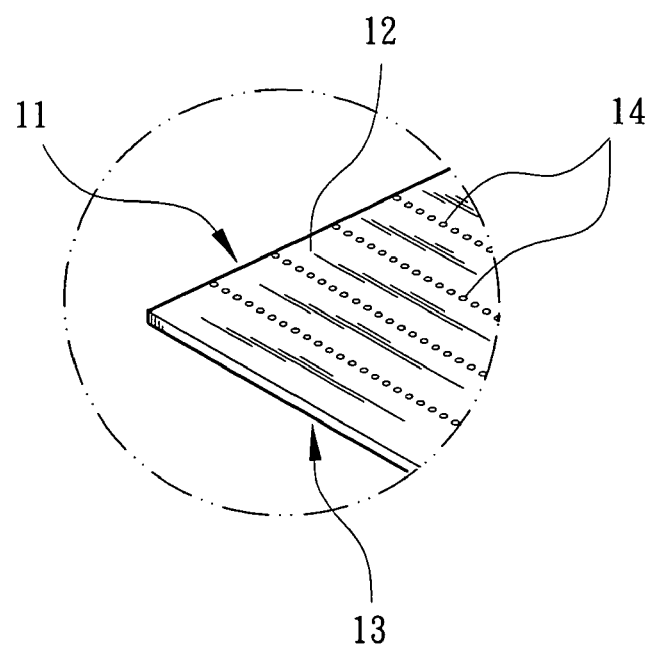
FIG. 4A is an enlarged view of circled area A of FIG. 4.
Figure 5:
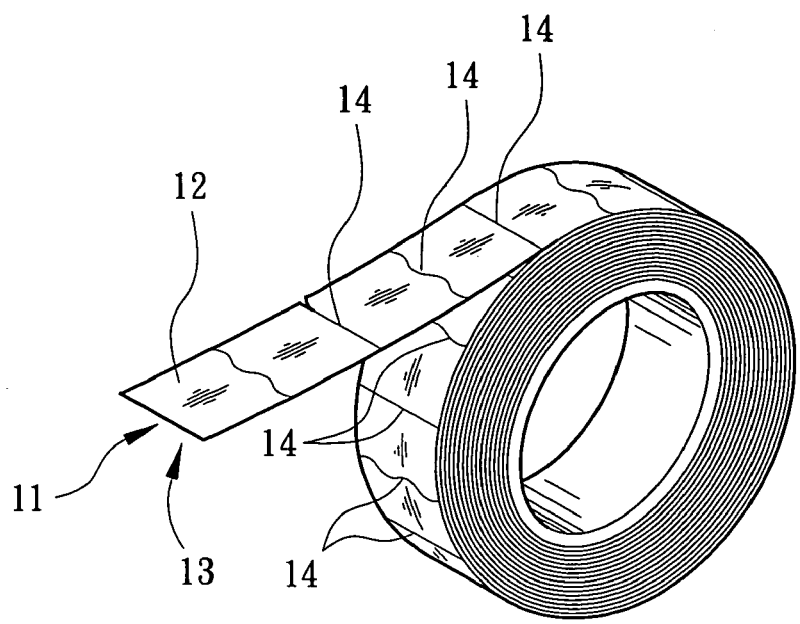
FIG. 5 is a perspective view of another embodiment of the present invention.
Figure 5A:
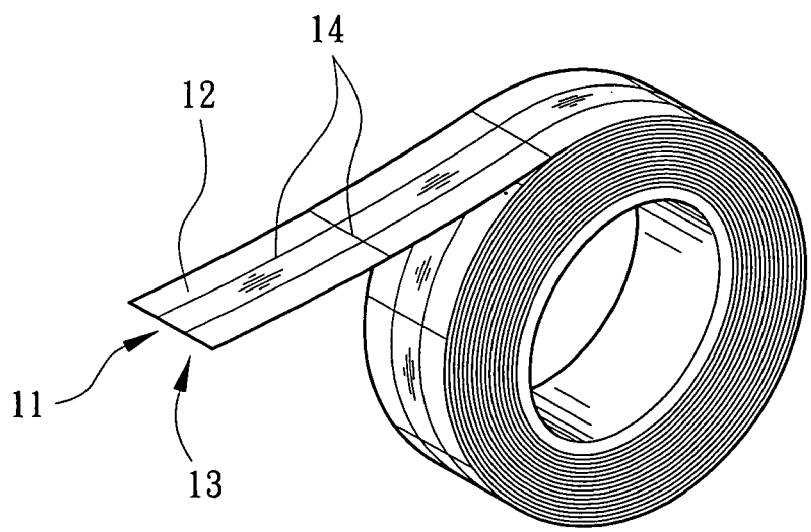
FIG. 5A is a perspective view of still another embodiment of the present invention.

Referring to FIGS. 3 and 4, it should be noted that a user can manually apply an external force or shear force to the tape in the forming direction of at least one embossed texture 14 to tear apart the tape or tear off a segment of the embossed magnetic tape. In a preferred embodiment, as shown in FIG. 5, the soft magnetic substrate 11 is formed with multiple embossed textures 14 spaced from each other by a predetermined length. The segment of the magnetic tape with a fixed length can be directly torn off for specific use. Alternatively, a user can use an auxiliary tool (such as a ruler or a blade) to tear off the segment of the magnetic tape along any of the embossed textures 14. Therefore, it is no more necessary to first measure the length of the segment and then tear off the segment.

The above embodiments are only used to illustrate the present invention, not intended to limit the scope thereof. Many modifications of the above embodiments can be made without departing from the spirit of the present invention.

What is claimed is:

1. A cut-free magnetic tape structure comprising an elongated tape-type soft magnetic substrate, the substrate having a releasable face and an adhesive face, a sprayed or painted coating being sprayed or painted on the releasable face, an adhesive layer being overlaid on the adhesive face, at least one of the two faces of the substrate being embossed with embossed textures, the embossed textures being one by one adjacently arranged on the face in an extending direction of the tape structure; the substrate being wound into a roll.

2. The cut-free magnetic tape structure as claimed in claim 1, wherein the embossed textures are adjacent grooves with a set depth.

3. The cut-free magnetic tape structure as claimed in claim 1, wherein each embossed texture has a ridge section and a valley section adjacent to the ridge section.

4. The cut-free magnetic tape structure as claimed in claim 1, wherein the embossed textures are linear grooves.

5. The cut-free magnetic tape structure as claimed in claim 1, wherein the embossed textures are dotted lines.

6. The cut-free magnetic tape structure as claimed in claim 1, wherein the embossed textures are linearly arranged orifices.

7. The cut-free magnetic tape structure as claimed in claim 1, wherein the embossed textures have irregular shapes.

8. The cut-free magnetic tape structure as claimed in claim 1, wherein the sprayed coating or painted coating is doped with a color.

9. The cut-free magnetic tape structure as claimed in claim 1, wherein multiple magnetic poles with different polarities are alternately adjacently arranged on the substrate in an extending direction thereof, the adjacent embossed textures being embossed at intervals on the basis of unit interval of the different magnetic poles.

10. The cut-free magnetic tape structure as claimed in claim 9, wherein the different magnetic poles are arranged at unequal intervals.

11. The cut-free magnetic tape structure as claimed in claim 9, wherein the embossed textures have irregular shapes.

12. The cut-free magnetic tape structure as claimed in claim 9, wherein the sprayed coating or painted coating is doped with a color.

13. The cut-free magnetic tape structure as claimed in claim 1, wherein the releasable face of the substrate is embossed with embossed textures adjacently arranged in the same direction.

14. The cut-free magnetic tape structure as claimed in claim 13, wherein the embossed textures are adjacent grooves with a set depth.

15. The cut-free magnetic tape structure as claimed in claim 13, wherein each embossed texture has a ridge section and a valley section adjacent to the ridge section.

16. The cut-free magnetic tape structure as claimed in claim 13, wherein the embossed textures are linear grooves.

17. The cut-free magnetic tape structure as claimed in claim 13, wherein the embossed textures are dotted lines.

18. The cut-free magnetic tape structure as claimed in claim 13, wherein the embossed textures are linearly arranged orifices.

19. The cut-free magnetic tape structure as claimed in claim 13, wherein the embossed textures have irregular shapes.

20. The cut-free magnetic tape structure as claimed in claim 13, wherein the sprayed coating or painted coating is doped with a color.

21. The cut-free magnetic tape structure as claimed in claim 13, wherein multiple magnetic poles with different polarities are alternately adjacently arranged on the substrate in an extending direction thereof, the adjacent embossed textures being embossed at intervals on the basis of unit interval of the different magnetic poles.

22. The cut-free magnetic tape structure as claimed in claim 1, wherein the releasable face of the substrate is embossed with embossed textures adjacently arranged in different directions.

23. The cut-free magnetic tape structure as claimed in claim 22, wherein the embossed textures are adjacent grooves with a set depth.

24. The cut-free magnetic tape structure as claimed in claim 22, wherein each embossed texture has a ridge section and a valley section adjacent to the ridge section.

25. The cut-free magnetic tape structure as claimed in claim 22, wherein the embossed textures are linear grooves.

26. The cut-free magnetic tape structure as claimed in claim 22, wherein the embossed textures are dotted lines.

27. The cut-free magnetic tape structure as claimed in claim 22, wherein the embossed textures are linearly arranged orifices.

28. The cut-free magnetic tape structure as claimed in claim 22, wherein the embossed textures have irregular shapes.

29. The cut-free magnetic tape structure as claimed in claim 22, wherein the sprayed coating or painted coating is doped with a color.

30. The cut-free magnetic tape structure as claimed in claim 22, wherein multiple magnetic poles with different polarities are alternately adjacently arranged on the substrate in an extending direction thereof, the adjacent embossed textures being embossed at intervals on the basis of unit interval of the different magnetic poles.

* * * * *